G. W. TERHORST.
ELECTRICAL TRANSFORMER.
APPLICATION FILED AUG. 29, 1912
1,190,481.
Patented July 11, 1916.
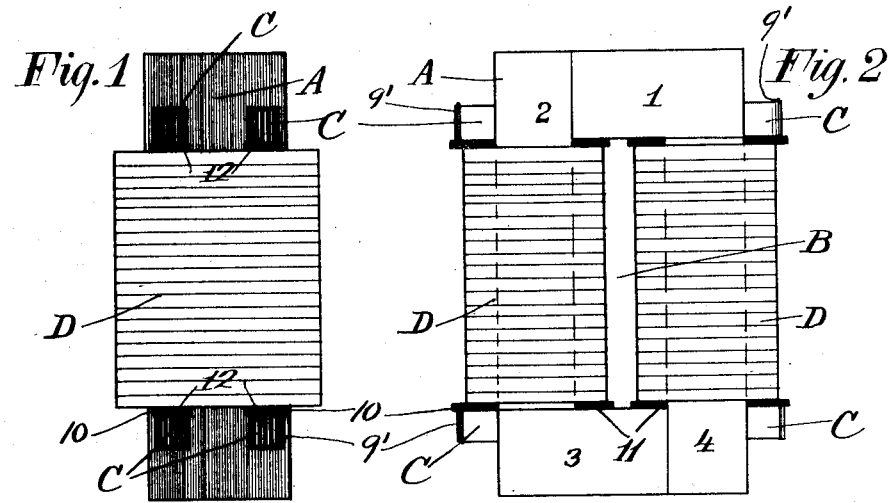
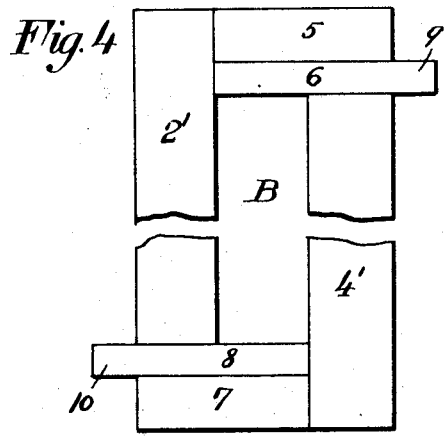
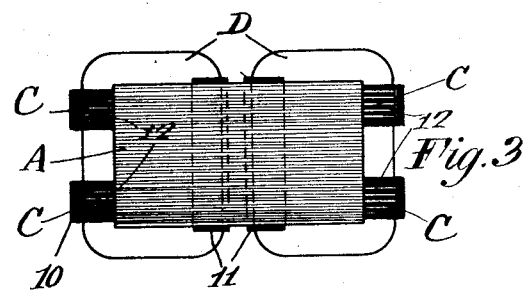
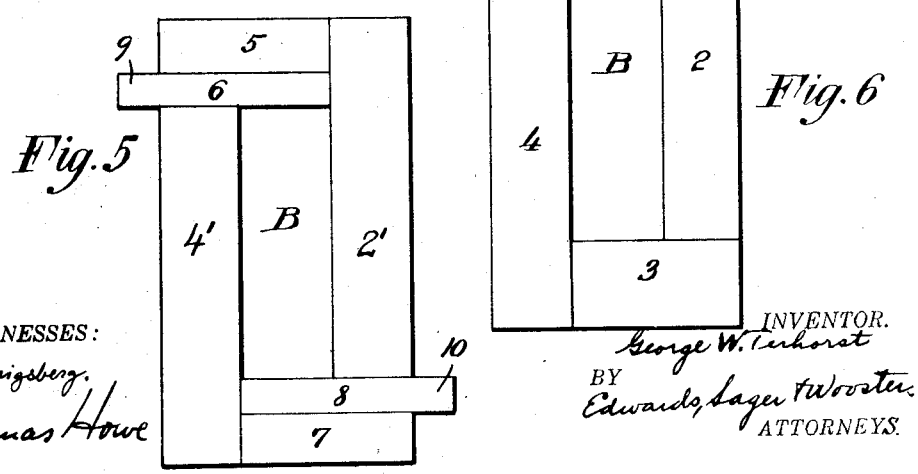
WITNESSES:
J. Konigsberg.
Thomas Howe
INVENTOR.
George W. Terhorst
BY Edwards, Sager & Wooster
ATTORNEYS.

UNITED STATES PATENT OFFICE.

GEORGE W. TERHORST, OF PITTSBURGH, PENNSYLVANIA, ASSIGNOR TO PITTSBURGH TRANSFORMER COMPANY, A CORPORATION OF PENNSYLVANIA.

ELECTRICAL TRANSFORMER.

1,190,481.     Specification of Letters Patent.     Patented July 11, 1916.

Application filed August 29, 1912. Serial No. 717,657.

*To all whom it may concern:*

Be it known that I, GEORGE W. TERHORST, a citizen of the United States, residing at Pittsburgh, in the county of Allegheny and State of Pennsylvania, have invented certain new and useful Improvements in Electrical Transformers, of which the following is a full, clear, and exact specification.

This invention relates to electrical transformers.

The object of the invention is to provide projections on the core of a transformer in an efficient and inexpensive manner, the projections serving for securing the windings in position or for other purposes.

The invention can be best described in connection with the accompanying illustrative drawings of which—

Figure 1 is an end elevation of a structure embodying the invention; Fig. 2 is a side elevation of the same; Fig. 3 is a plan of the same; Fig. 4 is a side elevation (partly broken away) of a layer of laminæ at a part having a projection; Fig. 5 is a similar view of a layer, the same as that of Fig. 4, but reversed, and Fig. 6 is a similar view of a layer of laminæ at a part where there is no projection, this layer being the same as, but reversed from the similar layer shown in Fig. 2.

Referring to the drawings, the electric transformer therein illustrated comprises an iron core A having a central opening B and projections C which serve to position and support the electrical windings D, which are on parallel legs of the core, these legs being magnetically joined by cross pieces or yokes as shown.

In building up the core and starting, say, from the right-hand side as it is seen in Fig. 1, a layer as shown in Fig. 2, or in Fig. 6, is formed. These layers as shown are exactly alike being formed of rectangular laminæ 1, 2, 3 and 4, but are alternately reversed with relation to each other when placed in position in the core. Assuming that the first layer is like that shown in Fig. 2, then the next layer to the left in Fig. 1, will be like Fig. 6, then there will be a layer like that in Fig. 2 and so on, the core being built up of the alternately reversed laminæ as described so that the joints between the laminæ are broken. This is continued until that portion of the core is arrived at at which the right-hand (Fig. 1) sides of the right-hand projections C are to begin, then instead of employing a layer as shown in Figs. 2 or 6, the layer as shown in Figs. 4 or 5 is placed at the left of that part of the core formed up to this point of the alternately reversed layers as shown in Figs. 2 and 6. The layers as shown in Figs. 4 and 5 are the same, being simply reversed when laid in position in the core. Each of the layers of Figs. 4 and 5 are formed of rectangular laminæ, the laminæ 2' and 4' being the same as 2 and 4 of the layers of Figs. 2 and 6. The other laminæ of the layer of Figs. 4 and 5 are not the same as the laminæ of Figs. 2 and 6. The laminæ 1 and 3 are each replaced by two laminæ, the lamina 1 being replaced by the two laminæ 5 and 6, while the lamina 3 is replaced by two laminæ 7 and 8. The laminæ 5 and 7 are alike and also the laminæ 6 and 8 are alike. The laminæ 6 and 8 are, however, longer than the laminæ 5 and 7 and consequently their ends form projections 9 and 10 from the main body of the layer and upon the layer having these projections, being laid upon each other, and alternately reversed, as shown by Figs. 4 and 5, the right-hand projections C at top and bottom, will be formed as is shown in Fig. 1 and also similar projections from the main body of the core will be formed upon the opposite side of the core from the right-hand projections as shown in Fig. 1. The laying up of the core is continued with the alternately reversed layers of Figs. 4 and 5 until the right-hand projections C are of the desired width. It will be observed that the alternate reversal of the layers of Figs. 4 and 5 serves to break the joints of the laminæ and further, the projections of the layer being symmetrical about the center of the core, the reversal of the layer serves to form projections upon opposite sides of the core. The desired width of projections having been secured, the laying up of the core then proceeds with the use of layers as shown in Figs. 2 and 6, these layers being alternately reversed as before described, and this procedure is continued until the right-hand sides of the left-hand projections as shown in Fig. 1, are reached. Alternately reversed layers of laminæ as shown in Figs. 4 and 5 are then employed as before described until these left-hand projections are of the desired width, when the core is completed to the left-hand edge by the use of the layers of the laminæ as shown in Figs. 2 and 6, these layers being laid upon each other and alternately reversed as before described.

The core having been laid up as described, the laminæ may be clamped together by bolts, screw-caps placed over the ends of the core or by any of the other suitable means well known for this purpose.

In building up the core as described, it will be seen that between each of the projections C there will be a space of the width of a lamina between the laminæ projecting from the main body of the core. In order that the projection may be made more solid, these spaces may be filled in with fillers 12, which may be pieces of laminæ of the same thickness as those used in the core and cut the same size as the projection. These fillers when inserted between the laminæ projecting from the core will make a practically solid projection and the whole may then be bound together by a cord 9' about the end of the projection.

It will be observed that in the construction shown the laminæ which extend from the main body of the core into the projections are sandwiched between the laminæ of the main body of the core, and hence a strong and reliable structure is secured.

It is preferably that pieces of insulation 10, which are inserted between the windings D and the projections C shall extend beyond the edges of those projections as shown and similarly it is preferable that pieces of insulation 11 interposed between the yoke pieces and the windings D should extend beyond the edges of those yoke pieces, and beyond the edges of the windings.

While the invention has been illustrated in what is considered its best application, it may be embodied in other structures, and is not therefore limited to the construction shown in the drawings. Also although I have described one method of building up the core other methods may be employed without departing from the spirit of the invention.

What I claim is:—

1. A laminated transformer core having laminated projections, the laminæ of the projections being sandwiched with those of the main body of the core and fillers secured between the aforesaid laminæ of the projections.

2. A laminated transformer core, windings for said core, said core having an interior opening for the passage of said windings and having projections for positioning said windings, said projections being formed by extensions from certain of the laminæ of which said core is composed, the laminæ having said extensions being built into the core, and all of the laminæ of said core being rectangular.

3. A laminated transformer core, windings for said core, said core having an interior opening for the passage of said windings and having oppositely disposed projections for positioning said windings, said projections being formed by extensions from certain of the laminæ of the core at one side thereof and at the opposite side thereof by reversing the layers of the laminæ.

4. A laminated transformer core, windings for said core, said core having an interior opening for the passage of said windings and having oppositely disposed projections for positioning said windings, said projections being formed by extensions from certain of the laminæ of the core at one side thereof and at the opposite side thereof by reversing the layers of the laminæ, and all of the laminæ of said core being rectangular.

5. A layer of laminæ for a transformer core having a central opening, said layer having on two opposite sides of said opening laminæ of the same size and at each of the other sides of the opening having two laminæ, one longer than the other.

In testimony whereof I affix my signature, in presence of two witnesses.

GEORGE W. TERHORST.

Witnesses:
L. C. MITCHELL,
W. G. STEELE.

Copies of this patent may be obtained for five cents each, by addressing the "Commissioner of Patents, Washington, D. C."